(12) United States Patent
Reeves-Nobles et al.

(10) Patent No.: US 6,535,594 B1
(45) Date of Patent: Mar. 18, 2003

(54) PRINTING CALLER ID

(76) Inventors: Bettie Reeves-Nobles, 23315 Brookwood Cir., Carrollton, VA (US) 23314-2661; Michael Nobles, 23315 Brookwood Cir., Carrollton, VA (US) 23314-2661

( * ) Notice: Subject to any disclaimer, the term of this patent is extended or adjusted under 35 U.S.C. 154(b) by 0 days.

(21) Appl. No.: 09/987,746

(22) Filed: Nov. 15, 2001

(51) Int. Cl.[7] .................................................. H04M 1/50
(52) U.S. Cl. ................... 379/142.01; 379/130; 379/131; 379/142.17
(58) Field of Search ................... 379/140, 130, 379/142, 142.01, 142.15, 142.14, 142.17, 142.11

(56) References Cited

U.S. PATENT DOCUMENTS

| | | | |
|---|---|---|---|
| 4,404,433 A | * 9/1983 | Wheeler et al. | ............. 379/140 |
| 4,656,657 A | * 4/1987 | Hunsicker | .................... 379/140 |
| 4,872,005 A | * 10/1989 | Deluca et al. | ......... 340/825.44 |
| 5,146,490 A | 9/1992 | Beckman | |
| 5,394,445 A | * 2/1995 | Ball et al. | ..................... 379/142 |
| 5,400,393 A | * 3/1995 | Knuth et al. | ................. 379/142 |
| 5,524,140 A | * 6/1996 | Klausner et al. | ........... 379/67.1 |
| 5,559,860 A | * 9/1996 | Mizikovsky | ................ 379/142 |
| 5,572,005 A | * 11/1996 | Hamilton et al. | ........... 379/144 |
| 5,625,676 A | 4/1997 | Greco et al. | |
| 5,748,718 A | * 5/1998 | Manicone | ................... 379/131 |
| 5,825,769 A | 10/1998 | O'Reilly et al. | |
| 5,836,009 A | 11/1998 | Diamond et al. | |
| 5,875,239 A | 2/1999 | Koralewski et al. | |
| 5,915,000 A | * 6/1999 | Nguyen et al. | ............. 379/142 |
| 6,118,859 A | 9/2000 | Giethoorn | |
| 6,125,170 A | 9/2000 | Sawaya | |
| 6,154,531 A | 11/2000 | Clapper | |
| 6,226,367 B1 | 5/2001 | Smith et al. | |
| 6,362,897 B1 | * 3/2002 | Berg et al. | .................... 358/1.6 |
| 6,373,934 B2 | * 4/2002 | Jensen | ........................ 379/140 |

FOREIGN PATENT DOCUMENTS

GB 2329092 3/1999

* cited by examiner

Primary Examiner—Rexford Barnie
(74) Attorney, Agent, or Firm—Richard C. Litman

(57) ABSTRACT

A printing caller ID device includes an audio recording device for recording incoming telephone messages and telephone numbers, and also includes a printer for printing telephone numbers received by a caller ID system associated with the device. The present device combines both of the above features in a single compact unit, suitable for desktop use or use in another area of limited space. The device includes controls for audio playback for listening to messages received, and also includes a touch screen system for operating the caller ID printer functions. The printer can be set to print all caller IDs received from initial actuation, or may be programmed to print caller IDs received during a preselected time period, as desired. The user of the present printing caller ID device is thus freed from having to listen to a series of audio messages to retrieve any desired information.

14 Claims, 3 Drawing Sheets

PRINTING CALLER ID

BACKGROUND OF THE INVENTION

1. Field of the Invention

The present invention relates generally to telephonic communications systems, and more particularly to an integrated device for receiving and recording incoming calls and also serving as a caller ID (caller identification) device. The present invention records the phone numbers of the recorded incoming calls, and also prints a list of the incoming call phone numbers and other caller information on demand by the user.

2. Description of the Related Art

Modern technology has led to the development of a number of enhancements to the basic telephone system. The invention and development of relatively simple recording systems (audio tape, etc.) resulted in the development of the answering machine, with its capability for recording unanswered calls when the receiving person was unavailable to take the call. More recently, certain developments have provided greater defenses for the call recipient, in the form of caller identification (caller ID) systems, in which at least the telephone number of the caller is provided in a display at the receiving phone, so the recipient of the call can determine whether he or she should answer the call.

The caller ID system has proven to be of great value in assisting people to sort out so-called "junk" calls, i. e., telemarketing calls and the like, from calls which are important to them. The answering machine also provides similar benefits, in that a person may skip through recorded audio messages which are not of interest to them. However, the problem with the answering machine system is that it requires the call recipient to scan through the recorded audio messages, with the recipient being required to note the phone numbers of any calls he or she wishes to return. If there has been a period of some few days, and/or the recipient tends to receive many calls, this process can require an inordinate amount of time. Another problem with such systems, is that oftentimes the answering machine reaches its full recording capacity, with the result that subsequent calls, and their phone numbers, are not recorded.

Accordingly, a need will be seen for a printing caller ID system which is capable of providing a printed list of at least the telephone numbers of calls received by the associated answering machine. Sufficient independence is provided between the audio answering machine and the caller ID printout, to provide a printout copy of all incoming telephone numbers, even though the audio recording capacity of the answering machine may be exceeded. The present invention may also be programmed to receive and print out such caller ID numbers only over a specific time period, if desired, and provides the above features and others in a single, compact unit for household and/or office use.

A discussion of the related art of which the present inventors are aware, and its differences and distinctions from the present invention, is provided below.

U.S. Pat. No. 5,146,490 issued on Sep. 8, 1992 to Alfred J. Beckman, titled "Passive Telephone Line Monitoring System," describes a system requiring a personal computer and computer printer for its operation. The computer and printer are separate units from the actual monitoring system, rather than having the recording and printout means combined within a single, unitary device, as in the present invention. Moreover, the Beckman system does not provide for the recording of the actual telephone conversation, as does the answering machine portion of the present invention. The Beckman device records only the time, date, and number of the call, and its duration, with none of the call content being recorded.

U.S. Pat. No. 5,625,676 issued on Apr. 29, 1997 to Robert C. Greco et al., titled "Method And Apparatus For Monitoring A Caller's Name While Using A Telephone," describes a complex system requiring at least two incoming telephone lines. the Greco et al. system includes a video display for displaying the name, phone number, brief status message, and duration of an incoming call to the call recipient while the recipient is on another phone line to another caller. The Greco et al. system does not provide any means of printing out the information, as it is intended for use as a real time system for displaying telephone call status as it occurs, rather than recording information for later use.

U.S. Pat. No. 5,825,769 issued on Oct. 20, 1998 to Dan O'Reilly et al., titled "System And Method Therefor Of Viewing In Real Time Call Traffic Of A Telecommunications Network," describes a very complex system intended for use in a large business which has a large telephone system or network for receiving incoming calls from customers. The O'Reilly et al. system utilizes a number of personal computers for displaying the date, time, phone number of the caller, call duration, and perhaps other information. This information may also be printed out in hard copy form. However, the O'Reilly et al. system does not provide any means of recording the actual conversation in an audio format nor of selecting a specific time period for review, as provided by the present invention. Moreover, the present system is a compact, integrated system incorporating both answering machine and printer for the caller ID information, in a single unit.

U.S. Pat. No. 5,836,009 issued on Nov. 10, 1998 to Robert Diamond et al., titled "Caller ID Telephone With Signal Attenuation," describes a system essentially combining elements of caller ID and call waiting services. The Diamond et al. system requires at least two incoming lines, and alerts a call recipient to a second call by attenuating the audio of the first call and audibly presenting the second caller's name and number over the first caller's call. The Diamond et al. system is more closely related to the system of the Greco et al. '676 U.S. Patent discussed further above, with its video display of the same information, than to the present printing caller ID system.

U.S. Pat. No. 5,875,239 issued on Feb. 23, 1999 to Karen Koralewski et al., titled "Telephone Call Screening System," describes a caller ID system interconnected with computer display of information about callers associated with a predetermined series of phone numbers. The Koralewski et al. system receives a phone number from the caller ID system and attempts to match that number with stored information. If a match is found, the stored information (picture of the caller, etc.) is displayed on a monitor screen. However, the Koralewski et al. system does not record calls for later screening and/or response, nor does it provide a hard copy printout of telephone numbers from a caller ID system, as provided by the present invention.

U.S. Pat. No. 5,915,000 issued on Jun. 22, 1999 to Vinh H. Nguyen et al., titled "Text Teletype Writer With Caller Identification Function," describes a system directed primarily to the hearing impaired. No audio operation is disclosed. Rather, a TTY (text teletype) machine is provided, with a video display of the caller ID number and caller's name, where applicable. The Nguyen et al. system provides for the user to review previous incoming caller IDs, but does not actually record the content of the call, either for audio playback or visual display, in any way. In contrast, the present printing caller ID system provides an audio playback of all incoming calls in a given period (to the limit of recording capability), and also provides a printed hard copy of all caller ID information over a given prior period, as selected by the user.

U.S. Pat. No. 6,118,859 issued on Sep. 12, 2000 to Harmen Giethoorn, titled "Telecommunications System And A Subscriber Device," describes a telephone call recording system which prioritizes incoming calls according to the frequency of calls from a given caller ID number. The phone number of a caller who calls several times would be retained by the system, and advanced in the recording system, over a single caller. This provides some sorting of more urgent calls from those having less urgency, and assures that messages from more urgent callers will not be lost if the device runs out of recording time. While the Giethoorn system is advantageous for conventional answering machines, the present system does not require such call prioritizing, as caller IDs from all incoming calls may be printed out in a hard copy format.

U.S. Pat. No. 6,125,170 issued on Sep. 26, 2000 to Frederick J. Sawaya, titled "Telephone Message Printing Method And Apparatus," describes a system using a personal computer (laptop, etc.) and specially configured printer to print the date, time, and phone number of incoming calls on a specially configured memo sheet. The Sawaya system differs from the present invention in at least two major respects. First, Sawaya does not provide any means for making an audio recording of the call, i. e., serving as an answering machine. Secondly, Sawaya does not provide any means for the user of the system to select a specific time period for the printing of his phone message memos. The present invention provides both audio recording and user selectable time periods.

U.S. Pat. No. 6,154,531 issued on Nov. 28, 2000 to Edward O. Clapper, titled "Telephone Caller Identification System," describes a system which interfaces with a television receiver or computer to display the phone number of an incoming telephone call by means of the caller ID signal. The person watching TV or using the computer is thus provided with the phone number of the incoming call, and can decide whether to answer the call or not without leaving the TV or computer to view a display at the phone. The Clapper system also provides an optional audio output of the phone number information, if desired. However, the Clapper system does not include a recording device to record a phone message from the caller, nor does it provide for other than real time display or printing out the caller ID information for later retrieval, as provided by the present system.

U.S. Pat. No. 6,226,367 issued on May 1, 2001 to Colin D. Smith et al., titled "Calling Line Identification With Location Icon," describes a system wherein the user may set up certain graphical displays and/or icons associated with a person having a given telephone number. When that person calls and the receiver identifies him/her by means of the caller ID system, the Smith et al. device associates the display and/or icon with the caller ID number, for the call recipient. The Smith et al. system is strictly a video display, and does not provide any audio recording of any messages from the caller, as does the answering machine portion of the present invention. Moreover, Smith et al. do not provide any form of hard copy printout of caller ID numbers.

Finally, British Patent Publication No. 2,329,092 published on Mar. 10, 1999 to Ericcson OMC Limited, titled "Calling Line Identifier Providing Distinctive Alert Modes For Caller Identification," describes a system which can discriminate between different incoming caller IDs and announce such different incoming calls in different ways, i. e., audible tone, vibrator, etc. However, the Ericcson OMC system does not provide any form of hard copy printout or listing of calls and caller IDs received, as does the present invention. Moreover, the Ericcson OMC system only operates in real time, and cannot record previous calls received for retrieval at a later time, as can the present system.

None of the above inventions and patents, taken either singularly or in combination, is seen to describe the instant invention as claimed. Thus a printing caller ID solving the aforementioned problems is desired.

SUMMARY OF THE INVENTION

The present invention comprises a printing caller ID system, combining an answering machine with its system for recording audio telephone messages and a small printer interface for producing printed hard copies of caller ID numbers received by the system. The present invention utilizes current technology to result in a relatively small, compact device including both of the above features. A touch screen system is used to control the printer system, with other controls provided for the audio recording system.

The present printing caller ID system provides numerous benefits over conventional audio answering machines which can record voice and telephone numbers, and visual displays which display the caller's telephone number when the call is received. The present system not only records incoming calls for retrieval at a convenient time, but also provides a hard copy of caller ID numbers which can be retrieved at some time after the call has been received. The user of the present invention can thus print out a listing of calls received, and can ignore or return those calls at leisure or when convenient. The present system can also be programmed to print a listing of incoming caller numbers for a specific predetermined time period, as desired, to further screen incoming calls.

Accordingly, it is a principal object of the invention to provide a printing caller ID device including an audio recorder for recording voice messages from callers, combined with a printer for printing a list of caller ID telephone numbers received.

It is another object of the invention to provide such a device which combines the above components in a single compact unit for desktop use or elsewhere where space may be limited.

It is a further object of the invention to provide means for programming the printer output to print telephone numbers received for a predetermined period of time, as desired.

Still another object of the invention is to provide a printing caller ID device using conventional rolled register paper, for economy of operation.

It is an object of the invention to provide improved elements and arrangements thereof for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention comprises a printing caller ID system or device, which records incoming telephone calls and messages as a conventional answering machine, and includes a caller ID system for determining the telephone number and/or caller identity of incoming calls. The present invention also includes a printer for printing out the telephone numbers and/or caller identifications received during a given period, with the period being selectable by the user of the device. A person using the present invention is thus not tied to the machine to listen to a series of messages and/or telephone numbers left in the form of audio recordings, and does not have to make notes of telephone numbers and/or callers while listening to an audio output of messages received, as in conventional answering machines. Rather, the user of the present machine need only print out a list of the numbers and/or callers, and return those calls as desired when convenient.

Figure 1:
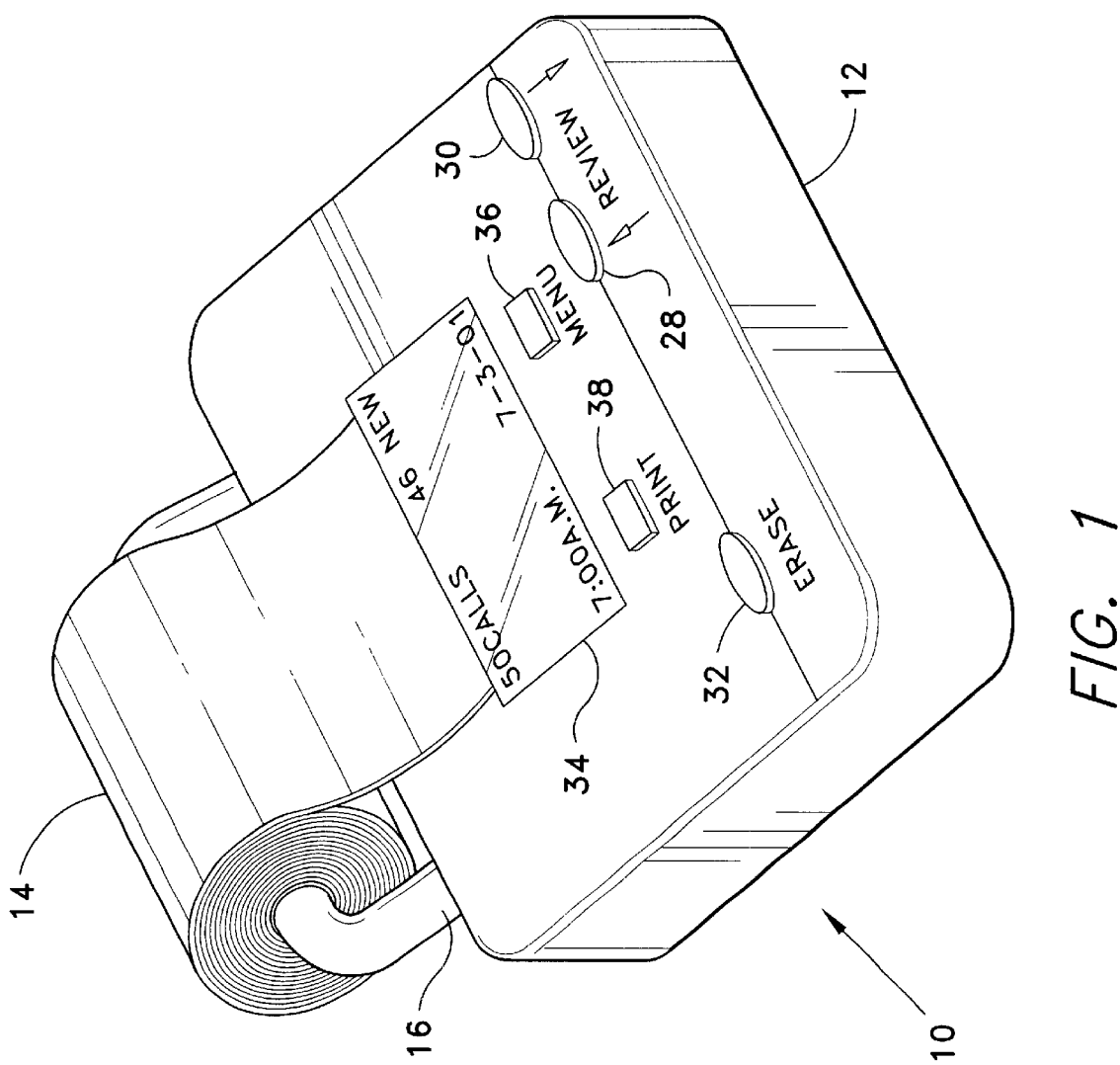
FIG. 1 is a perspective view of a printing caller ID device according to the present invention, showing its general configuration and features.

FIG. 1 of the drawings provides a perspective view of an exemplary embodiment of the present printing caller ID device 10. The present device 10 combines other compact electronic and mechanical subsystems and devices, as are known in the art, with the entire assembly being contained in a compact, unitary, portable case 12. The only external features are the roll of printer paper tape 14 and its holder 16, and the various controls and display screen, each described further below. While the case 12 is shown as having a generally low, flat, rectangular configuration, it will be seen that other configurations may be provided as desired.

Figure 2:
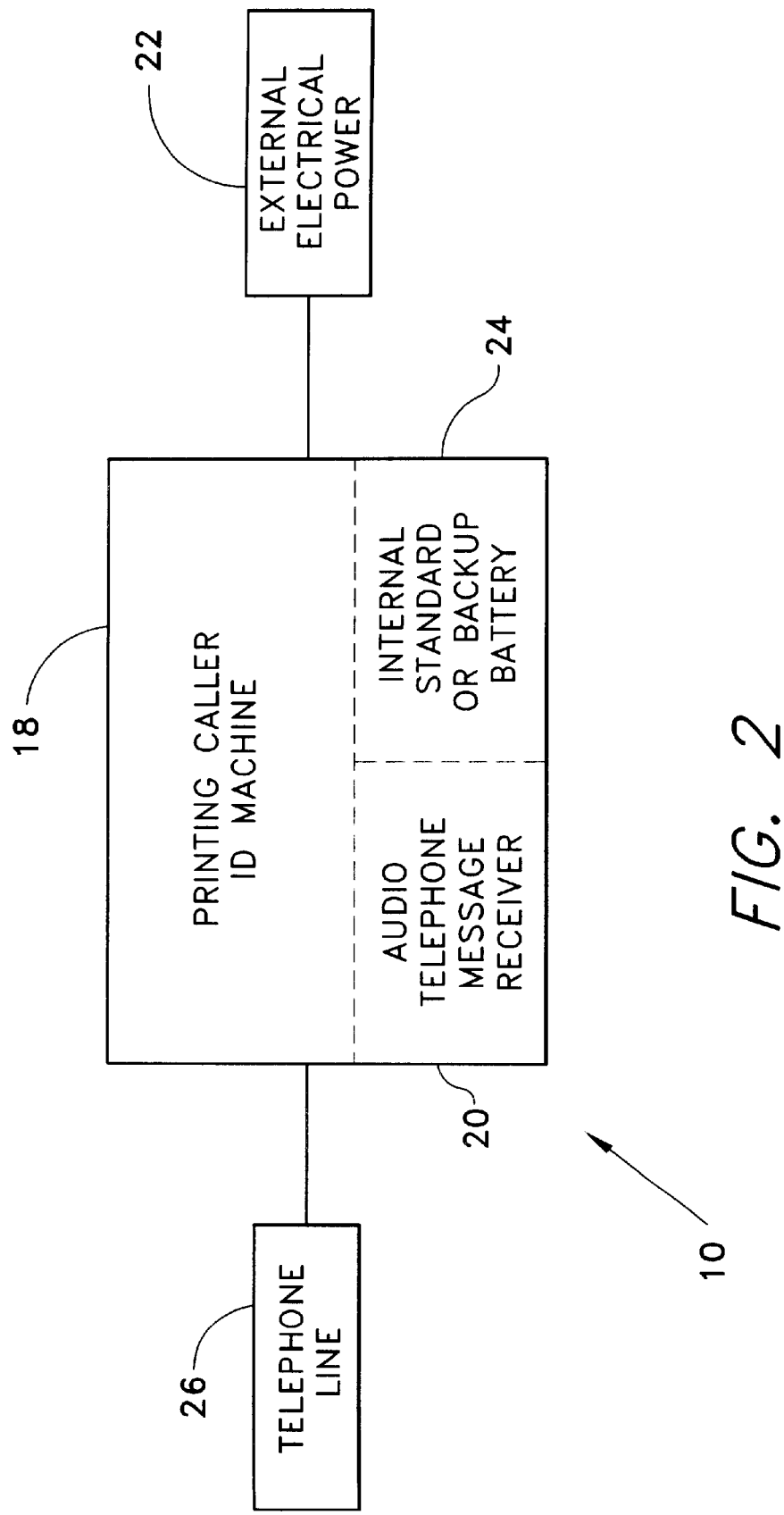
FIG. 2 is a block diagram showing the interface between the present printing caller ID device and external systems required for its operation.

FIG. 2 of the drawings provides a schematic view of the basic components of the present invention, and its interconnection with external systems. The heart of the present device 10 is a conventional caller ID system which records at least the telephone numbers of incoming calls, as is known in the art. Such a caller ID system may also be programmed in many cases with the names and/or other data relating to persons using certain telephone numbers, in order to display the name of the person rather than, or in addition to, that person's telephone number. The present invention also includes a conventional printer (laser, dot matrix, etc.) and interface means between the caller ID system and the printer, whereby the printer can print out a hard copy of the telephone numbers and/or other information relating to incoming telephone calls. The printing caller ID system, comprising the caller ID subsystem and printer subsystem, are indicated generally by the reference numeral 18 in the upper portion of the device 10 in FIG. 2.

The device 10 also includes an audio telephone message receiver 20 therewith, for automatically recording audio messages of incoming calls. The device 20 may comprise a conventional answering machine type device, using audio recording tape, solid state recording chips, or other means known in the art for recording voice from incoming telephone calls. The device 20 may record the telephone number and/or other identification of incoming calls, as well as any voice message which may be left by the caller.

The present device 10 is electrically powered, with electrical power being provided optionally from different sources as desired. The device 10 may utilize conventional public utility grid electrical power 22, i. e., nominally 115 volts ac, with conventional transformer and rectifier circuitry as required to provide the desired voltage and dc electrical power as required for operation of the device. Alternatively, an internal dc electrical supply 24 comprising one or more electrical power cells (batteries) may be provided. The device may include both external and internal electrical power, if so desired, with the internal electrical power serving as a backup or reserve electrical power source in the event of loss of power from the electrical power grid system.

FIG. 2 also schematically shows the interconnection of a conventional telephone line 26 with the present mechanism 10. The telephone line 26 interconnects conventionally with the recording means 20 and printing caller ID mechanism 18, using systems known in the art for the interconnection of conventional answering machines and the like to a telephone system. Only a single telephone line 26 is connected to the present device 10, as it is intended to function as a relatively simple recording mechanism for use in the household or small business having only a single incoming voice telephone line (as opposed to modem, fax, and/or other lines).

FIG. 1 of the drawings illustrates the basic controls for operating the various components of the present printing caller ID device 10. The operating controls may be loosely divided into a set of controls for operating the audio recording and playback system 20, and another set of controls for operating the caller ID printout system.

The audio recorder controls comprise forward and reverse controls or buttons, respectively 28 and 30, for operating the tape or other voice recording means to select or review specific voice messages as desired. An erase control or button 32 is also provided, for deleting messages no longer needed from the tape or recording chip, as desired.

The caller ID printer system is controlled by a touch screen display 34. A menu control or button 36 is used to select the desired screen, as is conventional in many touch screen systems known in the art. The menu button 36 may be used to select a predetermined time period, with caller ID information from all calls received during that time period being printed upon command by means of the print button or control 38. For example, if a user of the present device wished to record caller ID information for any calls between 2:00 pm and 6:00 pm on a given date. The user would use the menu button 36 to select the appropriate screen on the touch display screen 34, for selecting a specific time period. The user would then contact the begin point on the screen, and enter or scroll to the appropriate time, e. g., 2:00 pm. The end point for printing, e. g., 6:00 pm, is set in the same manner.

When the user of the present printing caller ID machine returns, he/she need only actuate the print button 38 in order to receive a printout of caller ID information from the preselected period, e. g., 2:00 pm to 6:00 pm on the given date. Alternatively, the user of the present invention may request a printout of all caller ID information from a given starting time and date, with no restrictions regarding an end time or specific time period. The present machine enables the user to retrieve the caller ID information in a convenient hard copy format, for review and response to calls as desired at his or her convenience.

Figure 3:
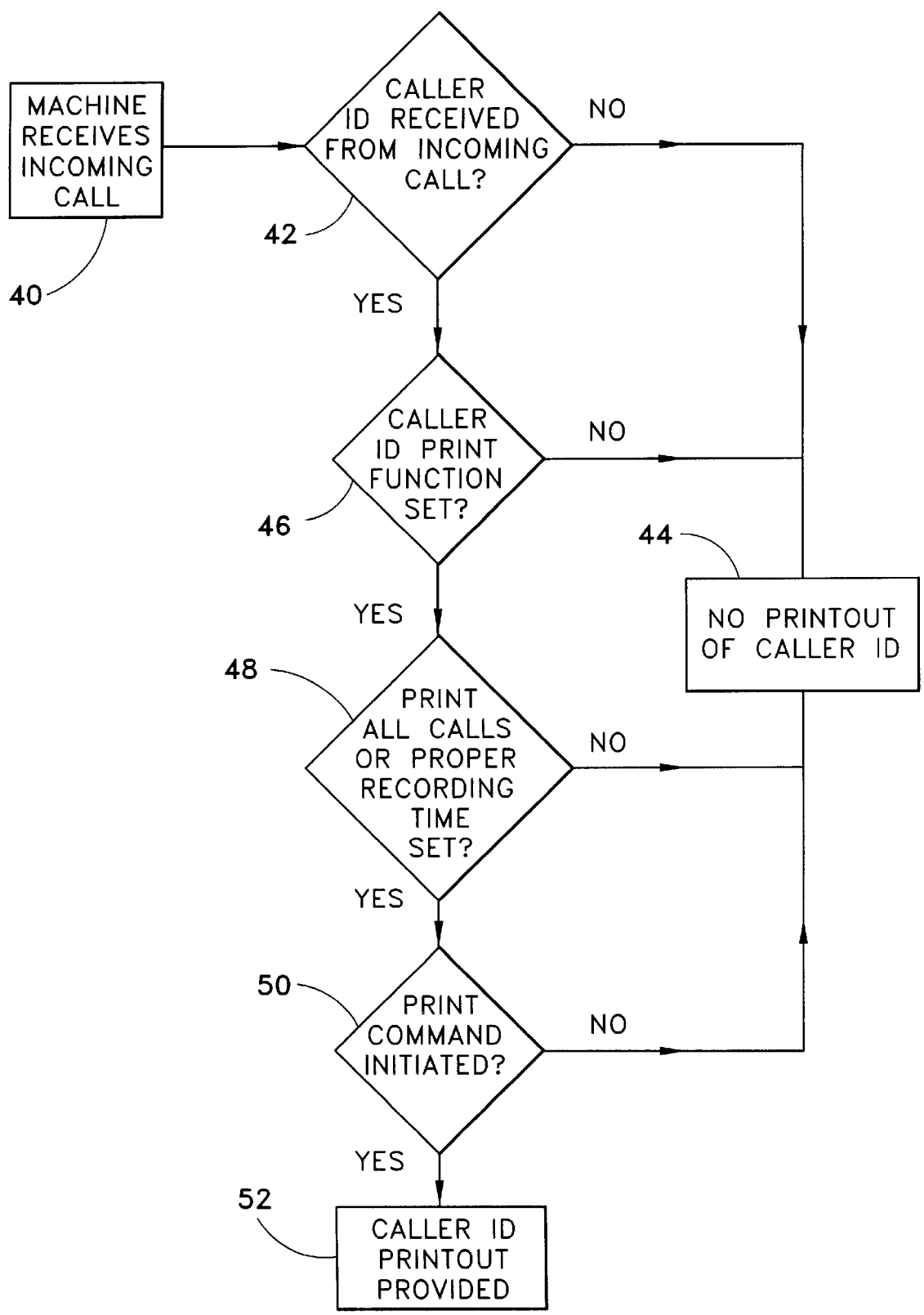
FIG. 3 is a flow chart illustrating the steps in the operation of the present printing caller ID device.

FIG. 3 of the drawings provides a flow chart illustrating the basic steps in the operation of the present printing caller ID device. When an incoming call is received by the device, as indicated by step 40, a caller ID must be received in order for the present printing caller ID system to function, as indicated by step 42. If no caller ID information is received, then no printout is possible, as indicated by step 44. Assuming the incoming call includes such caller ID information, then the machine must be set by using the appropriate menu 36 and touch screen 34 controls shown in FIG. 1, as indicated by the step 46 of FIG. 3. If the printer function has not been selected, then again no printout will occur, per step 44. However, if a print function has been selected in accordance with step 46, then the user must either select a time period for recording the caller ID information, or allow the machine to print out all caller ID information since the last printout, in accordance with step 48 of FIG. 3.

Once the appropriate caller ID time period has been selected (or a printout of all caller IDs since the previous printout), the user need only initiate the print command using the print button 38 shown in FIG. 1, as indicated by step 50 in FIG. 3 of the drawings. Once this has been accomplished, then a printout of all caller ID information received during the programmed period is provided, as indicated by step 52 of FIG. 3.

In conclusion, the present printing caller ID device provides a most convenient means for a recipient of telephone calls, to screen those calls in accordance with caller ID information provided by the telephone system. The present device not only functions as a conventional answering machine, with its audio recording means for recording brief messages from callers, and/or phone numbers and/or other caller ID information, but also includes a printer interfaced with the caller ID system for printing out a hard copy on paper of the caller ID phone numbers received. The present device may be programmed to print out caller IDs from calls received during a preselected period of time, or may be actuated to print out such a list extending from the previous printout. The provision of a hard copy of such caller ID information provides numerous advantages to the user, among them (a) the user is no longer tied to the machine and is no longer required to take notes of telephone messages received while receiving those messages, as in prior art audio message recorders, and (b) the provision of a hard copy on rolled paper can provide space for many more calls than an audio recording device may be capable of holding.

The small and compact size of the integrated unit, greatly facilitates installation and use as a desktop unit, or in any other area as required where space may be at a premium. The convenient and easy to use controls provided by the relatively few pushbuttons and the selectable menus of the touch screen, provide further user friendliness for the device. The present printing caller ID device will thus prove to be a most popular and desirable accessory by many people for home and office use.

It is to be understood that the present invention is not limited to the embodiments described above, but encompasses any and all embodiments within the scope of the following claims.

We claim:

1. A printing caller ID device, comprising:
   a case;
   caller identification recording means disposed within said case, for recording telephone numbers of the incoming calls;
   a printer disposed within said case, for selectively printing out the telephone numbers of the incoming calls;
   means for selectively programming said printer for printing out the telephone numbers of the incoming calls from a specific predetermined time period; and
   an audio telephone message receiver disposed within said case, for automatically recording incoming telephone calls and selectively playing back the calls as desired.

2. The printing caller ID device according to claim 1, wherein said case is a compact and portable unit.

3. The printing caller ID device according to claim 1, further including rolled paper tape for receiving the printed telephone numbers of the incoming calls.

4. The printing caller ID device according to claim 1, further including touch screen control means for controlling said printer.

5. The printing caller ID device according to claim 1, further including electrical power for said device selected from the group consisting of an external power supply and at least one internal electric power cell.

6. A printing caller ID device, comprising:
   a case;
   caller identification recording means disposed within said case, for recording telephone numbers of the incoming calls;
   a printer disposed within said case, for selectively printing out the telephone numbers of the incoming calls, said device including touch screen means for controlling said printer; and
   means for selectively programming said printer for printing out the telephone numbers of the incoming calls from a specific predetermined time period.

7. The printing caller ID device according to claim 6, wherein said case is a compact and portable unit.

8. The printing caller ID device according to claim 6, further including an audio telephone message receiver disposed within said case, for automatically recording incoming telephone calls and selectively playing back the calls as desired.

9. The printing caller ID device according to claim 6, further including rolled paper tape for receiving the printed telephone numbers of the incoming calls.

10. The printing caller ID device according to claim 6, further including electrical power for said device selected from the group consisting of an external power supply and at least one internal electric power cell.

11. A printing caller ID device, comprising:
    a case;
    caller identification recording means disposed within said case, for recording telephone numbers of the incoming calls;
    a printer disposed within said case, for selectively printing out the telephone numbers of the incoming calls, said device including touch screen control means for controlling said printer;
    means for selectively programming said printer for printing out the telephone numbers of the incoming calls from a specific predetermined time period; and
    an audio telephone message receiver disposed within said case, for automatically recording incoming telephone calls and selectively playing back the calls as desired.

12. The printing caller ID device according to claim 11, wherein said case is a compact and portable unit.

13. The printing caller ID device according to claim 11, further including rolled paper tape for receiving the printed telephone numbers of the incoming calls.

14. The printing caller ID device according to claim 11, further including electrical power for said device selected from the group consisting of an external power supply and at least one internal electric power cell.

* * * * *